United States Patent
Moradzadeh et al.

(10) Patent No.: US 11,551,324 B2
(45) Date of Patent: Jan. 10, 2023

(54) DEVICE, SYSTEM AND METHOD FOR ROLE BASED DATA COLLECTION AND PUBLIC-SAFETY INCIDENT RESPONSE

(71) Applicant: MOTOROLA SOLUTIONS, INC., Chicago, IL (US)

(72) Inventors: Gelayol Moradzadeh, Chicago, IL (US); Isabel Firpo, Chicago, IL (US); Curtis Porter, Stansbury Park, UT (US); Kylene Tanner, Bountiful, UT (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 580 days.

(21) Appl. No.: 16/684,635

(22) Filed: Nov. 15, 2019

(65) Prior Publication Data

US 2021/0150654 A1 May 20, 2021

(51) Int. Cl.
*G06Q 50/26* (2012.01)
*G10L 15/08* (2006.01)
*G10L 15/18* (2013.01)
*G10L 15/22* (2006.01)
*G06N 3/04* (2006.01)
*G06N 3/08* (2006.01)

(52) U.S. Cl.
CPC ........ *G06Q 50/265* (2013.01); *G10L 15/1815* (2013.01); *G10L 15/22* (2013.01); *G06N 3/04* (2013.01); *G06N 3/08* (2013.01); *G10L 2015/088* (2013.01)

(58) Field of Classification Search
CPC ... G06Q 50/265; G10L 15/1815; G10L 15/22; G10L 2015/088
See application file for complete search history.

(56) References Cited

U.S. PATENT DOCUMENTS

| 5,757,904 | A | 5/1998 | Anderson |
| 6,078,894 | A * | 6/2000 | Clawson .......... G06Q 10/06398 705/7.42 |
| 8,488,760 | B2 | 7/2013 | Abramson et al. |

(Continued)

FOREIGN PATENT DOCUMENTS

| AU | 2016216731 A1 | 9/2016 |
| CA | 2774056 A1 * | 3/2011 ......... G06F 19/3493 |

(Continued)

OTHER PUBLICATIONS

Riou, Marine, et al. "'She's sort of breathing': what linguistic factors determine call-taker recognition of agonal breathing in emergency calls for cardiac arrest?." Resuscitation 122 (2018): 92-98. (Year: 2018).*

*Primary Examiner* — Daniel C Washburn
*Assistant Examiner* — Oluwadamilola M Ogunbiyi
(74) *Attorney, Agent, or Firm* — Perry + Currier, Inc.

(57) ABSTRACT

A device, system and method for role based data collection and public-safety incident response is provided. A computing device receives a call to report a public-safety incident. The computing device determines a role of a caller on the call, the role of the caller being relative to the public-safety incident. The computing device retrieves, from one or more memories, data dependent on the role of the caller. The computing device controls a notification device to provide the data dependent on the role of the caller.

20 Claims, 5 Drawing Sheets (56) References Cited

U.S. PATENT DOCUMENTS

| | | | |
|---|---|---|---|
| 10,291,777 B1* | 5/2019 | Luo | H04M 3/5116 |
| 11,362,536 B2* | 6/2022 | Snyder | G01R 31/36 |
| 2006/0078094 A1* | 4/2006 | Breen | H04M 3/5116 |
| | | | 379/50 |
| 2007/0201664 A1 | 8/2007 | Salafia et al. | |
| 2009/0291663 A1* | 11/2009 | Schultz | H04M 3/465 |
| | | | 455/404.2 |
| 2011/0117878 A1* | 5/2011 | Barash | G08B 25/005 |
| | | | 340/539.12 |
| 2011/0307284 A1 | 12/2011 | Thompson et al. | |
| 2016/0352898 A1* | 12/2016 | Clawson | G06Q 50/265 |
| 2017/0187878 A1* | 6/2017 | Clawson | G06Q 50/265 |
| 2017/0371959 A1* | 12/2017 | Osotio | G01S 3/8083 |
| 2019/0251829 A1* | 8/2019 | Ho | H04M 3/5116 |
| 2019/0318290 A1* | 10/2019 | Clawson | H04M 3/5175 |
| 2019/0325288 A1* | 10/2019 | Oyenan | H04M 3/42195 |
| 2019/0348041 A1* | 11/2019 | Cella | G10L 15/16 |
| 2021/0057055 A1* | 2/2021 | Herbeck | G16H 10/60 |
| 2021/0228893 A1* | 7/2021 | Akram | A61N 1/3904 |
| 2021/0407273 A1* | 12/2021 | Jafri | A61N 1/3993 |

FOREIGN PATENT DOCUMENTS

| | | | | |
|---|---|---|---|---|
| CA | 2790916 C | * | 3/2018 | A61B 5/0002 |
| CN | 102576449 A | * | 7/2012 | A61B 5/0002 |
| JP | 2004171394 A | * | 6/2004 | A61B 5/0002 |
| WO | WO-2019112785 A1 | | 6/2019 | |

* cited by examiner

DEVICE, SYSTEM AND METHOD FOR ROLE BASED DATA COLLECTION AND PUBLIC-SAFETY INCIDENT RESPONSE

BACKGROUND OF THE INVENTION

When a caller uses a device, such as a phone, to call a public-safety answering point (PSAP, for example a 911 call center), to report an incident, it may be important to efficiently collect information from the caller in order to determine how to respond to the incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When a caller uses a device, such as a phone, to call a public-safety answering point (PSAP, for example a 911 call center), to report an incident, it may be important to efficiently collect information from the caller in order to determine how to respond to the incident. Hence, provided herein is a device, system and method which may improve efficiency of incident response by providing call-takers (e.g. 911 call-takers) with dynamically-adjusted amounts of information concerning an incident and a caller reporting the incident which depend on a determined role of the caller. For example, the device, system and method provided may dynamically providing 911 call-takers with relevant questions for collecting information from a caller that may enable efficient dispatch appropriate responders and/or faster convey pertinent information about the incident to the responders.

An aspect of the present specification provides a method comprising: receiving, at a public-safety computing device, a call to report a public-safety incident; determining, at the public-safety computing device, a role of a caller on the call, the role of the caller being relative to the public-safety incident; retrieving, at the public-safety computing device, from one or more memories, data dependent on the role of the caller; and controlling a notification device to provide the data dependent on the role of the caller.

Another aspect of the present specification provides a computing device comprising: a communication unit; and a controller configured to: receive, via the communication unit, a call to report a public-safety incident; determine a role of a caller on the call, the role of the caller being relative to the public-safety incident; retrieve, from one or more memories, data dependent on the role of the caller; and control a notification device to provide the data dependent on the role of the caller.

Figure 1:
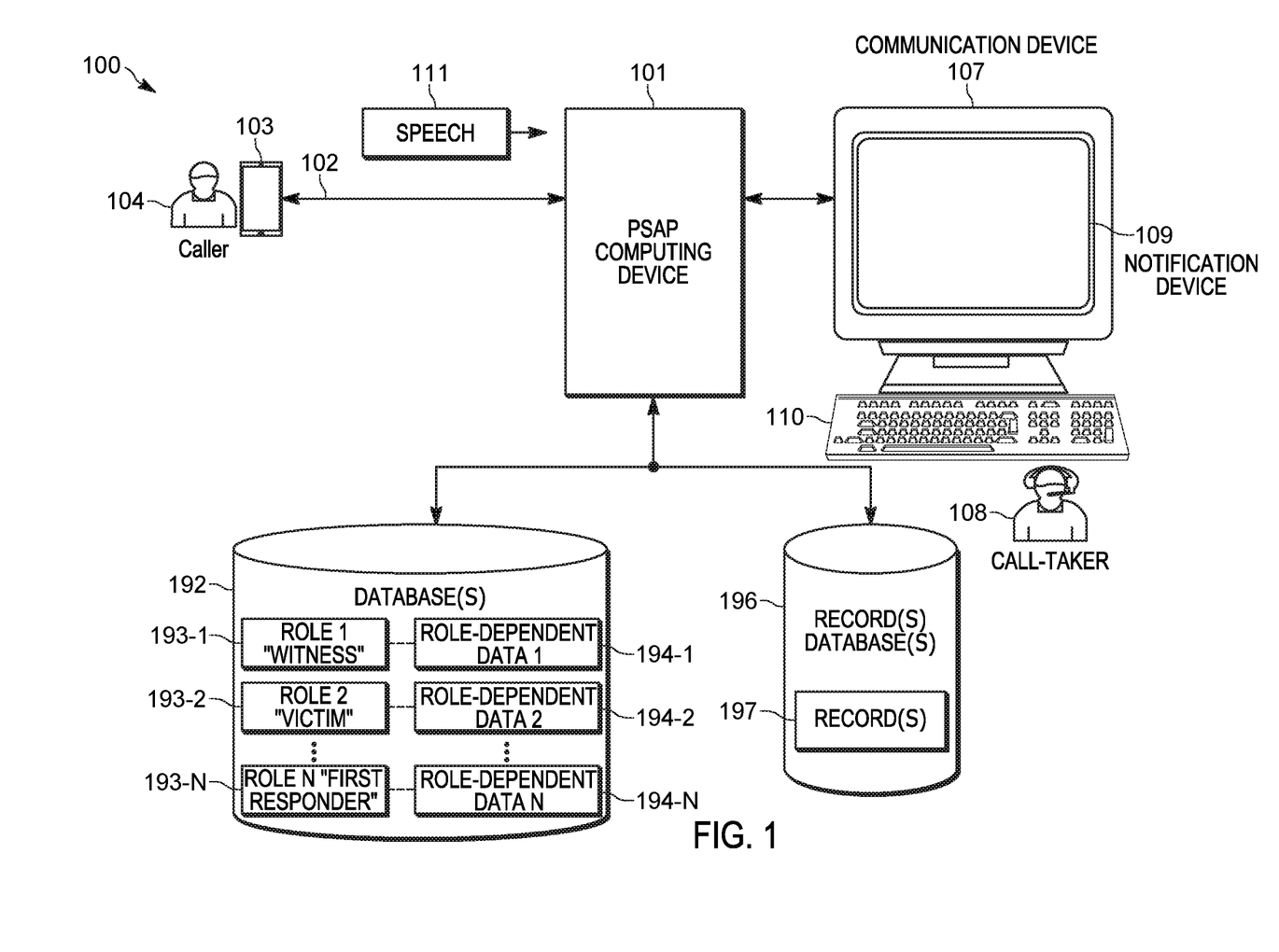
FIG. 1 is a system for role based data collection and public-safety incident response, in accordance with some examples.

Attention is directed to FIG. 1, which depicts an example system 100 for role based data collection and public-safety incident response. The system 100 comprises a computing device 101, which may comprise (e.g. as depicted) a public-safety answering point (PSAP) computing device. The computing device 101, interchangeably referred to hereafter as the device 101, is generally configured to receive calls; for example, as depicted, a call 102 from a calling device 103 operated by a caller 104 is received at the device 101.

As depicted, the system 100 further comprises a communication device 107 in communication with the device 101 via a communication link. As depicted, the communication device 107 may comprise a dispatch terminal to which the device 101 may forward the call 102. The communication device 107 is generally operated by a human user, for example, as depicted, a call-taker 108, such as a 911 call center operator, a dispatcher, and the like. The communication device 107 generally includes a notification device 109, for example, as depicted, a display screen; however the notification device 109 may include any suitable combination of one or more notification devices such as a display screen, a speaker, and the like. As depicted, the communication device 107 may further comprise an input device 110, which may include, but is not limited to, a keyboard (e.g. as depicted), a pointing device, a microphone, and the like, and/or any other suitable input device configured to receive input, for example by the call-taker 108 operating the input device 110 and/or interacting with the input device 110.

As depicted, the calling device 103 comprises a mobile device, but the calling device 103 may comprise any suitable communication device for making a call to the device 101 including, but not limited to, the depicted mobile device, public switched telephone network (PSTN) telephones, laptops, personal computers, and the like. Furthermore, the call 102 may occur via any suitable wireless or wired network and may include, but are not limited to, mobile phone calls, PSTN calls, Internet Protocol (IP) calls, calls made using applications, and the like.

While one calling device 103 is depicted in FIG. 1, the system 100 may comprise any suitable number of calling devices 103 and associated callers 104; similarly, while one communication device 107 is depicted in FIG. 1, the system 100 may comprise any suitable number of communication devices 107 (e.g. dispatch terminals) and associated call-takers 108 and/or human users.

The device 101 may be configured to receive the calls 102, from the calling device 103 and the like, in association with a public safety answering point, a 911 call center, and the like. For example, a communication device 107 may comprise a terminal of the PSAP, and a human user of a communication device 107 may comprise a call-taker 108 of the PSAP.

However, while present examples will be described with respect to a PSAP, the device 101 may be configured to receive calls 102 for any suitable type of call center, dispatch center, and the like.

As depicted, for example, the caller 104 has operated the calling device 103 to initiate the call 102 using a number (e.g. "911") for the PSAP, for example to report an incident. The device 101 automatically receives and/or answers the call 102 thereby causing a communication link between the device 101 and the calling device 103 to be generated using any suitable combination of wired and/or wireless networks. Communication links between components of the system 100 are depicted in FIG. 1, and throughout the present specification, as double-ended arrows between respective components; the communication links may include any suitable combination of wireless and/or wired links and/or wireless and/or wired communication networks. Hence, for example, communication links between the device 101 and the communication device 107 are generally established and the device 101 may forward and/or transfer the call 102 from the calling device 103 to the communication device 107 over such communication links.

As depicted, the caller 104 may be operating the calling device 103 to make the call 102 to the device 101 to report a public-safety incident (and/or provide information about the public-safety incident) via speech 111 spoken by the caller 104 on the call 102. Hereafter, the terms "incident" and "public-safety incident" are used interchangeably.

In some examples, the device 101 may answer the call 102 and, using a text-to-speech module (described below) communicate with the caller 104 and transcribe the speech 111 of the caller 104 to text using a speech-to-text module (e.g. also described below) prior to transferring the call 102 to the communication device 107 and the call-taker 108. Furthermore, the device 101 may include a natural language processing (NLP) module (described below). Using the text transcribed from the speech 111, and/or the NLP module, the device 101 may determine a role of the caller 104. For example, the caller 104 may be a witness to the incident, a victim of the incident, a first responder (e.g. attending to the incident and/or reporting the incident) and the like. Hence, the device 101 generally determines a "role" of the caller 104 relative to the incident. In some examples, however, a role of the caller 104 may be received via the input device 110.

In particular, as will be described hereafter, the device 101 is generally configured to: receive a call to report a public-safety incident; determine a role of a caller on the call, the role of the caller being relative to the public-safety incident; retrieve, from one or more memories, data dependent on the role of the caller; and control a notification device to provide the data dependent on the role of the caller.

For example, as depicted, the system 100 further comprises at least one database 192 in communication with the device 101. The database 192 may comprise any suitable database and/or memory, and the like, where role data 193-1, 193-2 . . . 193-N may be stored in respective association with role-dependent data 194-1, 194-2 . . . 194-N. Associations between data stored at the database 192 are indicated via dashed lines.

The role data 193-1, 193-2 . . . 193-N is interchangeably referred to hereafter, collectively, as the role data 193 and, generically, as a set of role data 193 (and/or role data 193); similarly, the role-dependent data 194-1, 194-2 . . . 194-N is interchangeably referred to hereafter, collectively, as the role-dependent data 194 and, generically, as a set of role-dependent data 194 (and/or role-dependent data 194).

Furthermore, the at least one database 192 may store an integer number "N" of sets of role data 193 and associated role-dependent data 194; while three (e.g. N=3) sets of role data 193 and associated role-dependent data 194 are depicted, the database 192 may store any suitable number of sets of role data 193 and associated role-dependent data 194. For example, different roles may be defined by an administrator of the system 100 and different role data 193, and associated role-dependent data 194 may be generated accordingly, and stored at the database 192. Hence, the role data 193, and associated role-dependent data 194 may be predetermined and/or preconfigured at the database 192.

As depicted, for example, the role data 193-1 defines a role of a "Witness" to an incident, the role data 193-2 defines a role of a "Victim" of an incident, and the role data 193-N defines a role of a "First Responder" for an incident. Hence, each set of role data 193 defines a different role relative to an incident. As described below, the associated role-dependent data 194 may comprise questions and/or instructions dependent on the role of the caller 104; however, the associated role-dependent data 194 may comprise any suitable information dependent on the role of the caller 104.

While each of the roles of the role data 193 may be related to a generic incident, in other examples, roles of the role data 193 may be for specific incident types. For example, the role data 193 may define a role of a "Witness To A Fire" and a different role of a "Witness To A Robbery", with similar roles defined for victims, first responders, and the like.

Furthermore the caller 104 may have more than one role. For example, the caller 104 may be both a first responder and a victim (e.g. when the caller 104, as a first responder, is hurt). In these examples, the role data 193 may be adapted to include a role for "First Responder As A Victim" and the like.

The role-dependent data 194 may comprise questions and/or instructions that may be provided to the caller 104 on the call 102, for example by the computing device 101 and/or the call-taker 108 (e.g. via the communication device 107), depending on a determined role of the caller 104. For example, the role-dependent data 194-1 may comprise questions to ask of a witness to an incident and/or instructions to provide to the witness, while the role-dependent data 194-2 may comprise questions to ask of a victim of an incident and/or instructions to provide to the victim.

However, in other examples, machine learning algorithms, and the like, may monitor calls to the device 101, as well as speech on the calls, and the machine learning algorithms may be trained to determine roles of callers and/or data dependent on role of the caller 104.

As depicted the system 100 as depicted, the system 100 further comprises at least one records database 196 in communication with the device 101. The records database 196 may comprise any suitable database and/or memory, where records 197 are stored which may include records 197 of the caller 104 or another person associated with the public-safety incident, as identified on the call 102. The records 197 may include one or more of medical records and/or medical data, police records and/or police data, personal records and/or personal data, social media records and/or social media data, and the like. Indeed, in some examples, the records database 196 may comprise one or more of: a medical records database, a police records database, a personal records database (e.g. storing, for example, names and addresses and/or telephone numbers of people, such as may be maintained by a phone company and/or a civic entity, such as a city government and the like), a social media database, and the like. In general, the computing device 101 has access to the database 192 and the records database 196. Indeed, when the records database 196 includes databases operated by private companies, (e.g. a social media database operated by a social media company), the computing device 101 may have been has been granted access to such databases; alternatively, the computing device 101 may not have been granted access to private information at such databases but may access public information at such databases (e.g. public data on social media accounts, and the like). Indeed, any suitable records database 196 is within the scope of present examples.

Figure 2:
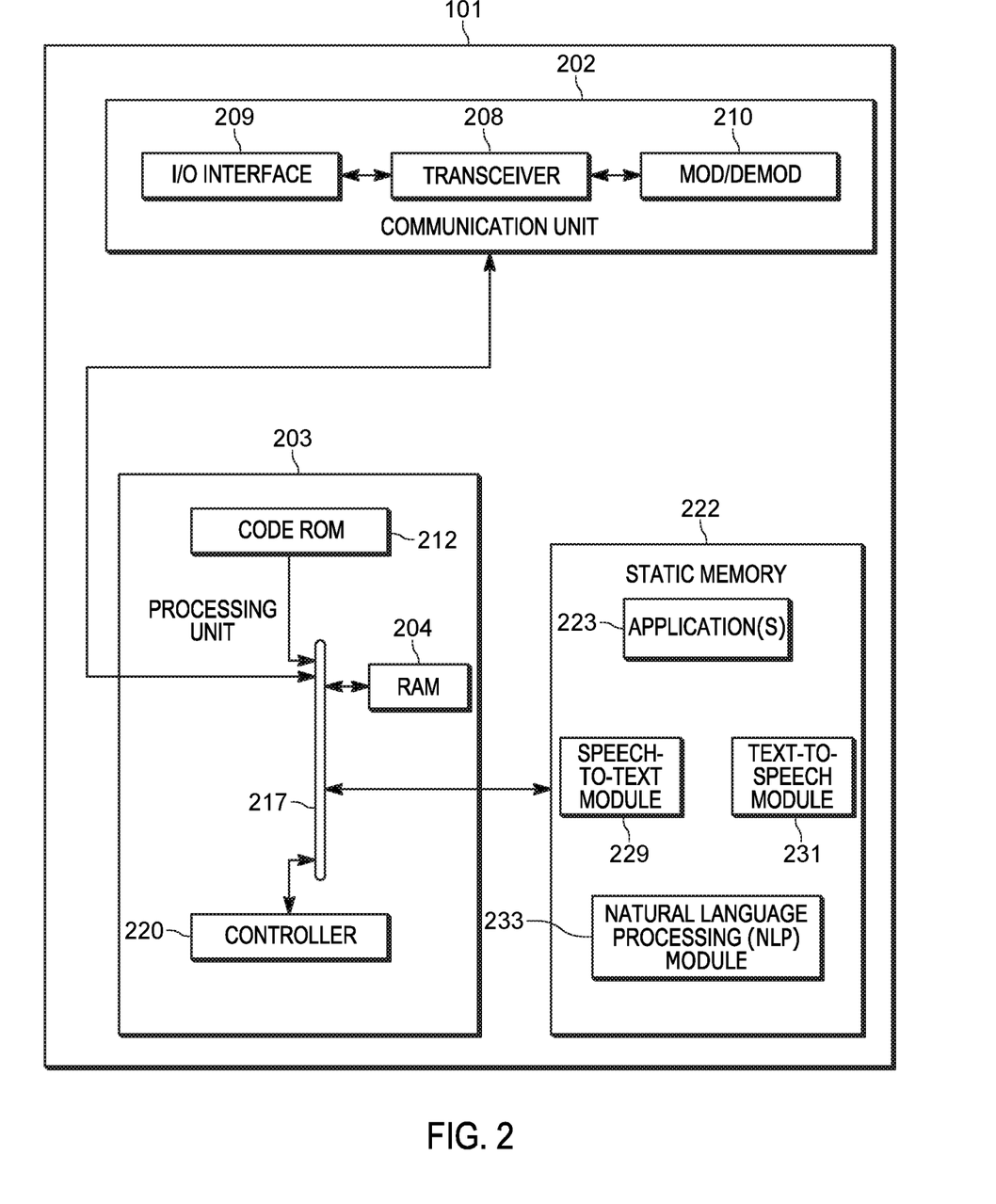
FIG. 2 is a device diagram showing a device structure of a computing device for role based data collection and public-safety incident response, in accordance with some examples.

Attention is next directed to FIG. 2 which depicts a schematic block diagram of an example of the device 101. In general, the device 101 may comprise one or more servers and/or one or more cloud computing devices, and the like, configured to communicate with the calling device 103 and the communication device 107. However, the device 101 may comprise a computing device such as a personal computer and/or a laptop computer, and the like. In some examples, the device 101 may be combined with the communication device 107. The device 101 may be located at a PSAP, and the like, and/or remote from a PSAP, and the like. Similarly, the device 101 may be located at a same facility (e.g. a PSAP) as the communication device 107, and the like, and/or the device 101 and the communication device 107 may be remote from each other; indeed, the communication device 107 may be remote from a PSAP, and the like.

As depicted, the device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the device 101 may include one or more of the input device and a display screen and the like, a microphone (e.g. to receive voice commands) such that a user, such as the call-taker 108, may interact with the device 101. However, a user, such as the call-taker 108, may interact with the device 101 via the communication device 107, for example via the notification device 109 and the input device 110.

As shown in FIG. 2, the device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the calling device 103 and the communication device 107. For example, the communication unit 202 may include one or more transceivers 208 and/or wireless transceivers for communicating with the calling device 103 and/or the communication device 107. Hence, the one or more transceivers 208 may be adapted for communication with one or more communication networks used to communicate with the calling device 103 and/or the communication device 107. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for role based data collection and public-safety incident response. For example, in some examples, the device 101 and/or the controller 220 specifically comprises a computer executable engine configured to implement functionality for role based data collection and public-safety incident response.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

As depicted, the memory 222 further stores a speech-to-text module 229 a text-to-speech module 231, and a natural language processing (NLP) module 233, which may be used by the device 101 and/or the controller 220 while implementing the application 223. The speech-to-text module 229 may be to convert speech and/or addresses (e.g. as received on a call 102) to text, and the text-to-speech module 231 may be to convert text to speech for example in examples where the device 101 provides notifications in the form of sound (e.g. at a speaker of the communication device 107), and the like. Furthermore, the NLP module 233 may be to monitor audio on the call 102 (e.g. the speech 111) to determine natural-language understanding, keywords, verb tense, a grammatical person (e.g. first person, second person etc.) of the audio and/or speech 111 on the call 102, and the like.

Figure 3:
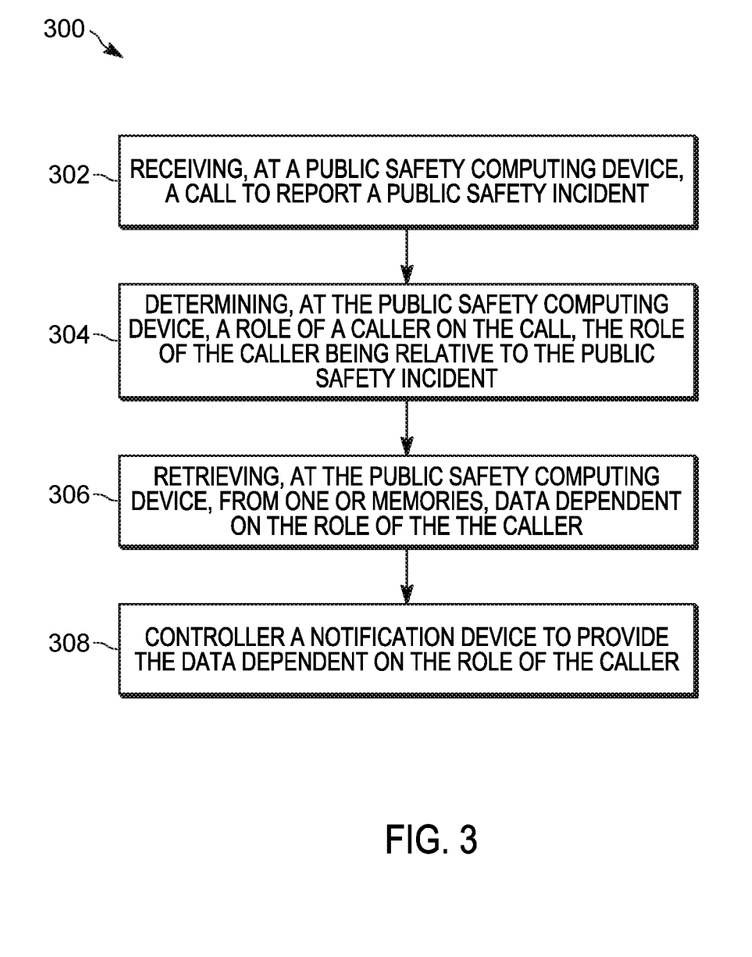
FIG. 3 is a flowchart of a method for role based data collection and public-safety incident response, in accordance with some examples.

In particular, the memory 222 stores instructions corresponding to the at least one application 223 (and which may include the modules 229, 231, 233) that, when executed by the controller 220, enables the controller 220 to implement functionality described herein including, but not limited to, the blocks of the method set forth in FIG. 3.

In illustrated examples, when the controller 220 executes the one or more applications 223, the controller 220 is enabled to: receive, via the communication unit 202, a call (e.g. the call 102) to report a public-safety incident; determine a role of a caller (e.g. the caller 104) on the call, the role of the caller being relative to the public-safety incident; retrieve, from one or more memories (e.g. one or more of the databases 192, 196), data dependent on the role of the caller; and control a notification device (e.g. the notification device 109) to provide the data dependent on the role of the caller.

The application 223 may include numerical algorithms to determine one or more of: a role of a caller, keywords, first person language, second person language, and the like on a call, as well as data dependent on the role of the caller. Such algorithms may be included at the NLP module 233.

Alternatively, the application 223 may include machine learning and/or deep-learning based algorithms and/or neural networks, and the like, which have been trained to determine one or more of: role of a caller, keywords, first person language, second person language, and the like on a call, and/or data dependent on the role of the caller. Such algorithms may be included at the NLP module 233.

Furthermore, in these examples, the application 223 may initially be operated by the controller 220 in a training mode to train the machine learning and/or deep-learning based algorithms and/or neural networks of the application 223 to determine one or more of: determine an address associated with a call; role of a caller, keywords, first person language, second person language, and the like on a call, and/or data dependent on the role of the caller.

The one or more machine learning algorithms and/or deep learning algorithms and/or neural networks of the application 223 may include, but are not limited to: a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments, such as a 911 call center. Any suitable machine learning algorithm and/or deep learning algorithm and/or neural network is within the scope of present examples.

While details of the calling device 103 and the communication device 107 are not depicted, the calling device 103 and the communication device 107 may have components similar to the device 101 adapted, however, for the functionality of the calling device 103 and the communication device 107. For example, the calling device 103 and/or the communication device 107 may include respective display screens (e.g. such as the notification device 109 as depicted), speakers, microphones, location determining devices (e.g. GPS devices), and the like.

Attention is now directed to FIG. 3 which depicts a flowchart representative of a method 300 for role based data collection and public-safety incident response. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 101 receives (e.g., via the communication unit 202), the call 102 to report a public-safety incident. For example, the caller, the caller 104 may call the device 101 to report an incident, for example by calling "911" and the like. In some examples, device 101 may initially communicate with the caller 104 via the text-to-speech module 231, while in other examples, the device 101 may connect the call 102 to the communication device 107 so that the call-taker 108 may speak with the caller 104; in either examples, the device 101 may monitor the speech 111 on the call using the speech-to-text module 229 and/or the NLP module 233.

At a block 304, the controller 220 and/or the device 101 determines a role of the caller 104 on the call 102, the role of the caller 104 being relative to the public-safety incident. For example, the device 101 may ask an initial series of questions via the text-to-speech module 231 and the caller 104 may provide answers in the speech 111. Alternatively, the call-taker 108 may ask initial questions on the call 102 and the device 101 and the caller 104 may provide answers in the speech 111. Alternatively the caller 104 may spontaneously provide information in the speech 111 when the call 102 is answered. Regardless, the device 101 may monitor the speech 111 using the speech-to-text module 229 and/or the NLP module 233, to determine a role of the caller 104.

For example, the speech-to-text module 229 may be used to transcribe the speech on the call 102 to text, which may be used to determine whether the text from the transcribed speech includes a role of the caller 104 and/or an indication of the role of the caller 104. Similarly, the NLP module 233 may be used to monitor the speech on the call 102 to determine whether the speech 111 includes a role of the caller 104 and/or an indication of the role of the caller 104. In other words, the caller 104 may not specifically say "I am a witness" and/or "I am a victim" and/or "I am a first responder", but the speech 111 may indicate whether the caller 104 is a witness to the incident or a victim of the incident.

For example, the caller 104 may say "I saw a big explosion and a building is burning, and my friend was hurt" which may indicate that the caller 104 has a role of a "Witness". Alternatively, the caller 104 may say "I was in a big explosion and now the building I am in is burning and I am hurt" which may indicate that the caller 104 is a victim. Alternatively, the caller 104 may say "I was in patrol car when I saw a big explosion and now there's a fire; my partner and I are attempting to direct traffic" which may indicate that the caller 104 is a first responder (e.g. a police officer). The speech and/or audio in these examples include keywords (which may include key phrases) such as "I saw a big explosion . . . my friend was hurt", "I was in a big explosion . . . I am hurt" and "I was in patrol car" which respectively indicate a role of a witness, a victim and a first responder. Indeed, these keywords further include indications of grammatical person, which may indicate the role of the caller 104; for example the first person phrase "I am hurt" may indicate the caller 104 is a victim, the second person phrase "My friend was hurt" may indicate the caller 104 is a witness.

Hence, in some examples, the controller 220 and/or the device 101 may determine the role of the caller by: monitoring audio on the call 102 using natural language processing. In other examples, the controller 220 and/or the device 101 may determine the role of the caller by: monitoring audio on the call 102 to identify keywords. In yet further examples the controller 220 and/or the device 101 may determine the role of the caller by: determining whether the caller 104 is speaking in first person language or second person language.

In yet further examples, the caller 104 and the call-taker 108 may be speaking to each other over the call 102. In these examples, the controller 220 and/or the device 101 may determine the role of the caller by monitoring audio on the call 102 to identify keywords spoken by one or more of: the caller 104; and the call-taker 108 speaking with the caller 104 on the call 102. In other words, the call-taker 108 may make statements such "OK, then you are a witness to the explosion", or "You are hurt? We will send an ambulance", or "Roger, patrol officer, please stay at the scene", and/or any other statement may indicate a role of the caller 104.

In yet further examples, the call-taker 108 may speak to the caller 104 and operate the input device 110 to indicate the role of the caller 104. For example, the call-taker 108 may operate the input device 110 to select a menu item that indicates the role of the caller 104 (e.g. a menu item for one or more of "Witness", "Victim" and "First Responder", and the like). Hence, in some examples, the controller 220 and/or the device 101 may determine the role of the caller 104 by receiving, from the input device 110, input data identifying the role. For example, the input data may comprise selection of the menu item, as described above, and/or text indicating the role (e.g. "Caller is a Witness"), and the like.

As described above, the role may comprise one or more of: a witness to the public-safety incident; a victim of the public-safety incident; and a first responder attending to the public-safety incident. For example, a described above, a first responder may have roles of both a first responder and a victim (e.g. when the first responder is hurt).

In some examples, at the block 304, the controller 220 and/or the device 101 may further determine a type of the incident, for example using keywords in the speech 111, natural language processing, and the like.

At a block 306, the controller 220 and/or the device 101 retrieves, from one or more memories (e.g. one or more of the databases 192, 196), data dependent on the role of the caller 104.

In general, the controller 220 and/or the device 101 may determine the role of the caller 104 and access the database 192 to select the associated role data 193, for example via a database lookup. For example, when the caller 104 is determined to be a "Witness", a "Victim" or a "First Responder", the associated role data 193-1, role data 193-2 or the role data 193-N may be respectively selected. Once a set of role data 193 is selected, the controller 220 and/or the device 101 may retrieve an associated set of role-dependent data 194. Hence, for example, when the role data 193-1 is selected, the set of role-dependent data 194-1 is retrieved.

When the caller 104 is determined to have more than one role, the associated sets of role data 193 may be selected, and the associated sets of role-dependent data 194 may be retrieved.

As described above, in these examples, the data dependent on the role of the caller 104, of the block 306, may comprise the associated role-dependent data 194, such as questions dependent on the role of the caller 104, and/or instructions to provide to the caller 104, also dependent on the role of the caller 104.

For example, when the caller 104 is a witness, questions of the role-dependent data 194-1 may include, but are not limited to, questions about what the witness is seeing, address confirmation, and the like. Similarly, when the caller 104 is a witness, instructions of the role-dependent data 194-1 may include, but are not limited to, instructions for providing medical care to a victim (e.g. cardio-pulmonary resuscitation (CPR)), and the like, for example when the incident includes a medical incident where a victim is hurt, and the like; such instructions may further include instructions for moving to a safe zone around an incident.

Similarly, when the caller 104 is a victim, questions of the role-dependent data 194-2 may include, but are not limited to, questions about the health of the victim (e.g. "Can you breathe"), and the like. Similarly, when the caller 104 is a victim, instructions of the role-dependent data 194-2 may include, but are not limited to, instructions for dealing with a medical condition (e.g. "lay down"), and the like.

Indeed, as described above, such questions and/or instructions may be particular for a type of incident. However, such questions and/or instructions may be generic and not for a particular type of incident.

In yet further examples, the controller 220 and/or the device 101 may retrieve data dependent on the role of the caller 104 from the records database 196. For example, when the caller 104 is a victim, a name and/or identity of the caller 104 may be determined and associated medical records 197 may be retrieved, for example to assist in determining any medical conditions of the caller 104. However, when the caller 104 is a witness, medical records 197 of the caller 104 may not be retrieved, but police records 197 and/or social media records 197 of the caller 104 may be retrieved. Indeed, the type of records 197 retrieved may depend on an incident type. Hence, the data dependent on the role of the caller 104 may comprise records 197 of the caller 104

In yet further examples, the controller 220 and/or the device 101 may retrieve from one or more memories (e.g. the records database 196), records 197 of another person associated with the public-safety incident, as identified on the call 102. For example, when, on the call 102, the caller 104 is determined to be a witness and mentions a name of a victim and/or a suspect in the incident on the call 102, any suitable associated records 197 of the victim and/or the suspect (such as medical records and/or police records) may be retrieved.

At a block 308, the controller 220 and/or the device 101 controls the notification device 109 to provide the data dependent on the role of the caller 104.

For example, when the notification device 109 comprises a display screen, the controller 220 and/or the device 101 may control the display screen to render the role-dependent data 194 and/or the records 197 retrieved at the block 306. Alternatively, the role-dependent data 194 and/or a portion of the records 197 may be asked using a speaker and the text-to-speech module 231.

Hence, for example, questions and/or instructions of the role-dependent data 194 may be provided at the notification device 109 such that the call-taker 108 may ask the questions and/or provide the instructions to the caller 104 on the call 102.

Alternatively, a speaker of the calling device 103 may comprise a notification device and the controller 220 device 101 may automatically ask the questions and/or provide the instructions to the caller 104 on the call 102, for example using the text-to-speech module 231.

Figure 4:
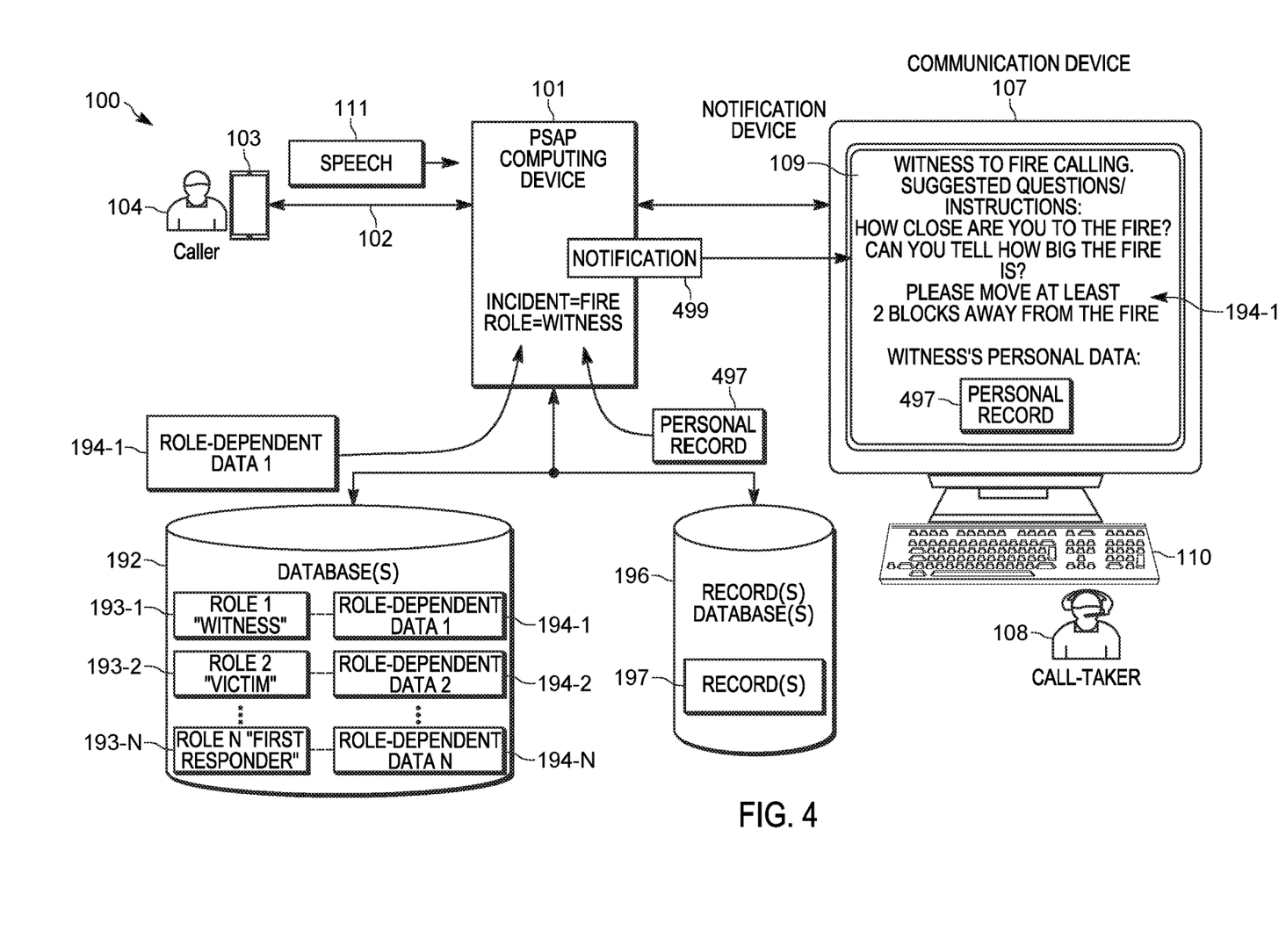
FIG. 4 depicts an example of a role based data collection and public-safety incident response implemented in the system of FIG. 1, in accordance with some examples.
Figure 5:
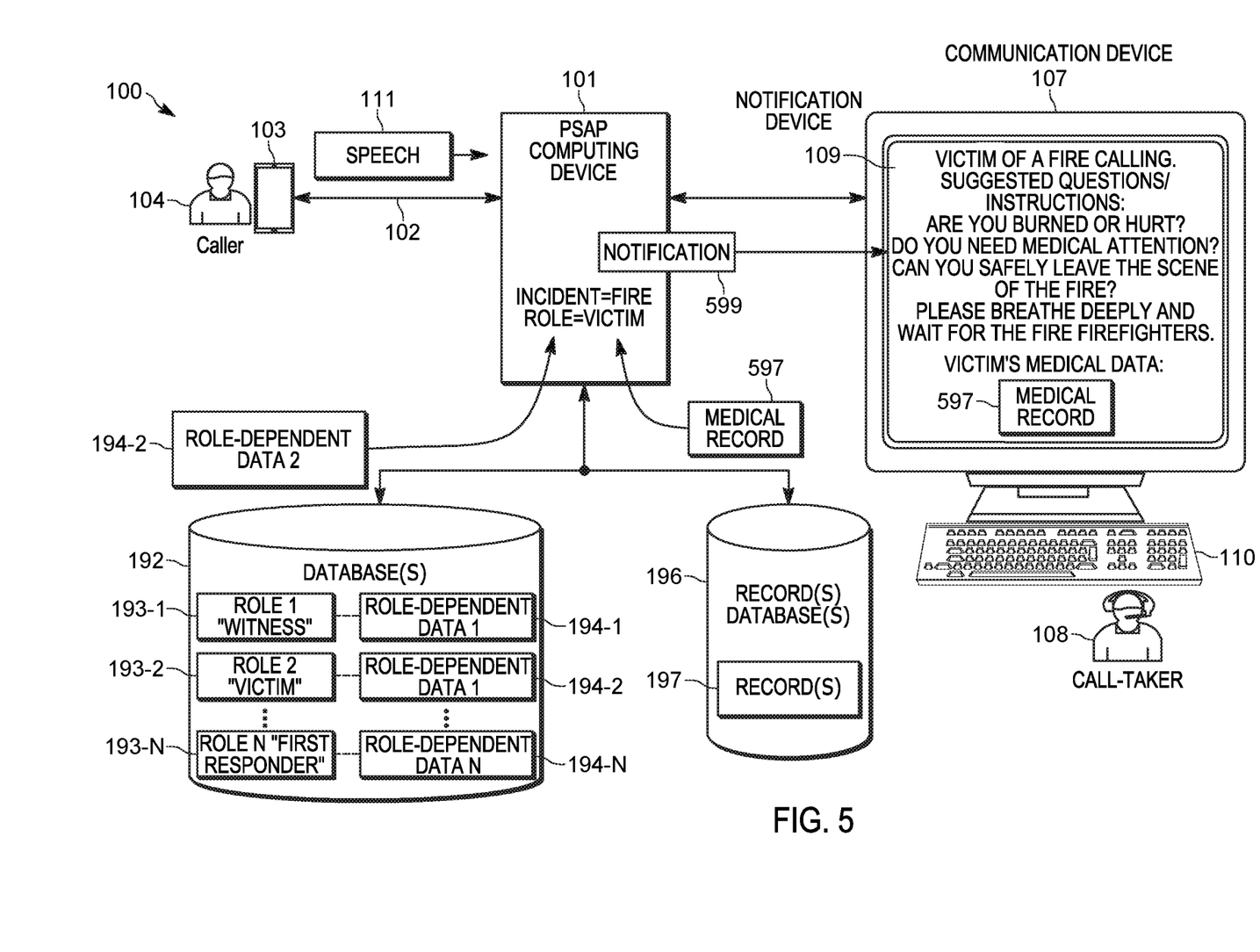
FIG. 5 depicts another example of a role based data collection and public-safety incident response implemented in the system of FIG. 1, in accordance with some examples.

Attention is next directed to FIG. 4 and FIG. 5 which depict examples of the method 300. FIG. 4 and FIG. 5 are similar to FIG. 1, with like components having like numbers.

With reference to FIG. 4, the device 101 receives the call 102 (e.g. at the block 302 of the method 300) and determines (e.g. at the block 304 of the method 300) from the speech 111 that the role of the caller 104 is a "Witness" to an incident, and that the incident is a "Fire", though determination of the incident type may be optional. The device 101 hence retrieves (e.g. at the block 306 of the method 300), the role-dependent data 194-1 associated with the role data 193-1 of a "Witness". As depicted, the device 101 may optionally determine a name and/or identity of the caller 104 and retrieve (e.g. at the block 306 of the method 300), from the records database 196, a personal record 497 of the caller 104, for example, an address and/or phone number of the caller 104; in some examples, the personal record 497 may comprise a police record, and the like. Such a retrieval of the record 497 may include, but is not limited to, retrieving a link to the record 497 as stored at the records database 196.

The device 101 generates a notification 499 which comprises data dependent on the role of the caller 104, for example the role-dependent data 194-1 and/or the record 497 and/or a link to the record 497, and provides the notification 499 to the communication device 107 to control (e.g. at the block 308 of the method 300) the notification device 109 to provide the data dependent on the role of the caller 104.

As depicted, the notification device 109 comprises a display screen and hence the data dependent on the role of the caller 104 may be rendered at the display screen. For example, as depicted, the display screen renders questions and instructions of the role-dependent data 194-1, as well as the record 497, and/or a link to the record 497 at the records database 196. As depicted the questions and instructions of the role-dependent data 194-1 are specific to an incident type of a fire (e.g., "How close are you to the fire? Can you tell how big the fire is? Please move at least 2 blocks away from the fire"). However, in other examples the questions and/or instructions may be generic and/or not associated with a specific incident (e.g., "How close are you to the incident? Can you tell how serious the incident is? Please move at least 2 blocks away from the incident"). The questions and/or instructions may be asked by the call-taker 108 to the caller 104, on the call 102. When the call-taker 108 collects answers to the questions, for example, the call-taker 108 may more efficiently dispatch first responders to the incident, for example when a size of the fire, and the like, is determined.

With reference to FIG. 5, the device 101 receives the call 102 (e.g. at the block 302 of the method 300) and determines (e.g. at the block 304 of the method 300) from the speech 111 that the role of the caller 104 is a "Victim" of an incident, and that the incident is a "Fire", though determination of the incident type is optional. The device 101 hence retrieves (e.g. at the block 306 of the method 300), the role-dependent data 194-2 associated with the role data 193-2 of a "Victim". As depicted, the device 101 may optionally determine a name and/or identify of the caller 104 and retrieve (e.g. at the block 306 of the method 300), from the records database 196, a medical record 597 of the caller 104, for example as the caller 104 may need medical attention as the victim of a fire incident. Such a retrieval of the record 597 may include, but is not limited to, retrieving a link to the record 597 as stored at the records database 196.

The device 101 generates a notification 599 which comprises data dependent on the role of the caller 104, for example the role-dependent data 194-2 and/or the record 597 and/or a link to the record 597, and provides the notification 599 to the communication device 107 to control (e.g. at the block 308 of the method 300) the notification device 109 to provide the data dependent on the role of the caller 104.

As depicted, the notification device 109 comprises a display screen and hence the data dependent on the role of the caller 104 may be rendered at the display screen. For example, as depicted, the display screen renders questions and instructions of the role-dependent data 194-2, as well as the record 597, and/or a link to the record 597 at the records database 196. As depicted the questions and instructions of the role-dependent data 194-2 are specific to an incident type of a fire (e.g., "Are you burned or hurt? Do you need medical attention? Can you safely leave the scene of the fire? Please breathe deeply and wait for the fire firefighters."). However, in other examples the questions and/or instructions may be generic and/or not associated with a specific incident (e.g., "Do you need medical attention? Can you safely leave the scene of the incident? Please breathe deeply and wait for the first responders."). The questions and/or instructions may be asked by the call-taker 108 to the caller 104, on the call 102. When the call-taker 108 collects answers to the questions, for example, the call-taker 108 may more efficiently dispatch first responders to the incident, for example to attend to the victim.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like).

Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   receiving, at a public-safety computing device, a call to report a public-safety incident;
   determining, at the public-safety computing device, by implementing, via a natural language processing module, one or more of numerical algorithms, machine learning algorithms deep-learning based algorithms and neural networks a role of a caller on the call, the role of the caller being relative to the public-safety incident;
   retrieving, at the public-safety computing device, from one or more memories, data dependent on the role of the caller; and
   controlling a notification device to provide the data dependent on the role of the caller.

2. The method of claim 1, wherein determining the role of the caller comprises:
   monitoring audio on the call using the natural language processing module.

3. The method of claim 1, wherein determining the role of the caller comprises:
   monitoring audio on the call to identify keywords.

4. The method of claim 1, wherein determining the role of the caller comprises:
   monitoring audio on the call to identify keywords spoken by one or more of: the caller;
   and a call-taker speaking with the caller on the call.

5. The method of claim 1, wherein determining the role of the caller comprises:
   determining whether the caller is speaking in first person language or second person language.

6. The method of claim 1, wherein determining the role of the caller comprises:
   receiving, from an input device, input data identifying the role.

7. The method of claim 1, wherein the role comprises one or more of:
   a witness to the public-safety incident;
   a victim of the public-safety incident; and
   a first responder attending to the public-safety incident.

8. The method of claim 1, wherein the data dependent on the role of the caller comprises questions dependent on the role of the caller.

9. The method of claim 1, wherein the data dependent on the role of the caller comprises one or more of: records of the caller, personal data of the caller, social media data of the caller, police data of the caller, and medical data of the caller.

10. The method of claim 1, further comprising:

retrieving, from the one or more memories, records of another person associated with the public-safety incident, as identified on the call.

11. A device comprising:

a communication unit; and a controller configured to:

receive, via the communication unit, a call to report a public-safety incident;

determine by implementing, via a natural language processing module, one or more of numerical algorithms, machine learning algorithms deep-learning based algorithms and neural networks, a role of a caller on the call, the role of the caller being relative to the public-safety incident;

retrieve, from one or more memories, data dependent on the role of the caller; and control a notification device to provide the data dependent on the role of the caller.

12. The device of claim 11, wherein the controller is further configured to determine the role of the caller by:

monitoring audio on the call using the natural language processing module.

13. The device of claim 11, wherein the controller is further configured to determine the role of the caller by:

monitoring audio on the call to identify keywords.

14. The device of claim 11, wherein the controller is further configured to determine the role of the caller by:

monitoring audio on the call to identify keywords spoken by one or more of: the caller;

and a call-taker speaking with the caller on the call.

15. The device of claim 11, wherein the controller is further configured to determine the role of the caller by:

determining whether the caller is speaking in first person language or second person language.

16. The device of claim 11, wherein the controller is further configured to determine the role of the caller by:

receiving, from an input device, input data identifying the role.

17. The device of claim 11, wherein the role comprises one or more of:

a witness to the public-safety incident;

a victim of the public-safety incident; and a first responder attending to the public-safety incident.

18. The device of claim 11, wherein the data dependent on the role of the caller comprises questions dependent on the role of the caller.

19. The device of claim 11, wherein the data dependent on the role of the caller comprises one or more of: records of the caller, personal data of the caller, social media data of the caller, police data of the caller, and medical data of the caller.

20. The device of claim 11, wherein the controller is further configured to:

retrieve, from the one or more memories, records of another person associated with the public-safety incident, as identified on the call.

* * * * *